(12) United States Patent
Baloga

(10) Patent No.: US 6,457,774 B2
(45) Date of Patent: Oct. 1, 2002

(54) CHILD SAFETY SEAT

(75) Inventor: Thomas Charles Baloga, Fort Mill, SC (US)

(73) Assignee: Britax Child Safety Inc., Charlotte, NC (US)

( * ) Notice: Subject to any disclaimer, the term of this patent is extended or adjusted under 35 U.S.C. 154(b) by 0 days.

(21) Appl. No.: 09/863,628

(22) Filed: May 23, 2001

Related U.S. Application Data

(60) Provisional application No. 60/209,662, filed on Jun. 6, 2000.

(51) Int. Cl.[7] .............................. A47C 1/08; A47D 1/10
(52) U.S. Cl. ..................... 297/250.1; 297/482; 297/484
(58) Field of Search ................................ 297/482, 484, 297/250.1

(56) References Cited

U.S. PATENT DOCUMENTS

| | | | | |
|---|---|---|---|---|
| 2,633,573 A | * | 4/1953 | Sanders ................... 297/482 X |
| 2,637,849 A | * | 5/1953 | Nelson ................... 297/482 X |
| 4,887,318 A | * | 12/1989 | Weinreb ................... 297/482 X |
| 5,084,946 A | | 2/1992 | Lee ............................. 24/625 |
| 5,380,067 A | * | 1/1995 | Turvill et al. ............... 297/484 |
| 5,398,997 A | * | 3/1995 | McFalls ................... 297/484 X |
| 5,584,536 A | * | 12/1996 | White ......................... 297/482 |
| 5,839,793 A | | 11/1998 | Merrick et al. ............. 297/482 |
| 5,873,635 A | * | 2/1999 | Merrick ............... 297/250.1 X |
| 5,899,534 A | * | 5/1999 | Gray ........................... 297/484 |
| 5,908,223 A | * | 6/1999 | Miller ..................... 297/482 X |
| 6,045,184 A | * | 4/2000 | Nakagawa ............... 297/250.1 |
| 6,089,662 A | * | 7/2000 | Lambert et al. ........ 297/484 X |
| 6,189,970 B1 | * | 2/2001 | Rosko ...................... 297/250.1 |
| 6,260,925 B1 | * | 7/2001 | Miller ................. 297/250.1 X |
| 2001/0013719 A1 | * | 8/2001 | Carine et al. ........ 297/250.1 X |

FOREIGN PATENT DOCUMENTS

DE 3150-489 A * 6/1983 ................. 297/482

* cited by examiner

*Primary Examiner*—Rodney B. White
(74) *Attorney, Agent, or Firm*—Davis & Bujold, P.L.L.C.

(57) ABSTRACT

A child safety seat has a harness including a pair of shoulder straps extending through respective slots in the seat back and a respective lap strap connected to each shoulder strap. A shoulder pad is slidably mounted on each shoulder strap. Each shoulder pad has an upper loop attached to its upper end and a lower loop attached to its lower end, the corresponding shoulder strap being threaded through said upper and lower loops. A respective fixed-length tether extends between the upper end of each shoulder pad and the seat back. A separable link assembly has a first link part slidably mounted on one shoulder strap between the upper and lower loops and a second link part slidably mounted on the other shoulder strap between the upper and lower loops.

2 Claims, 2 Drawing Sheets

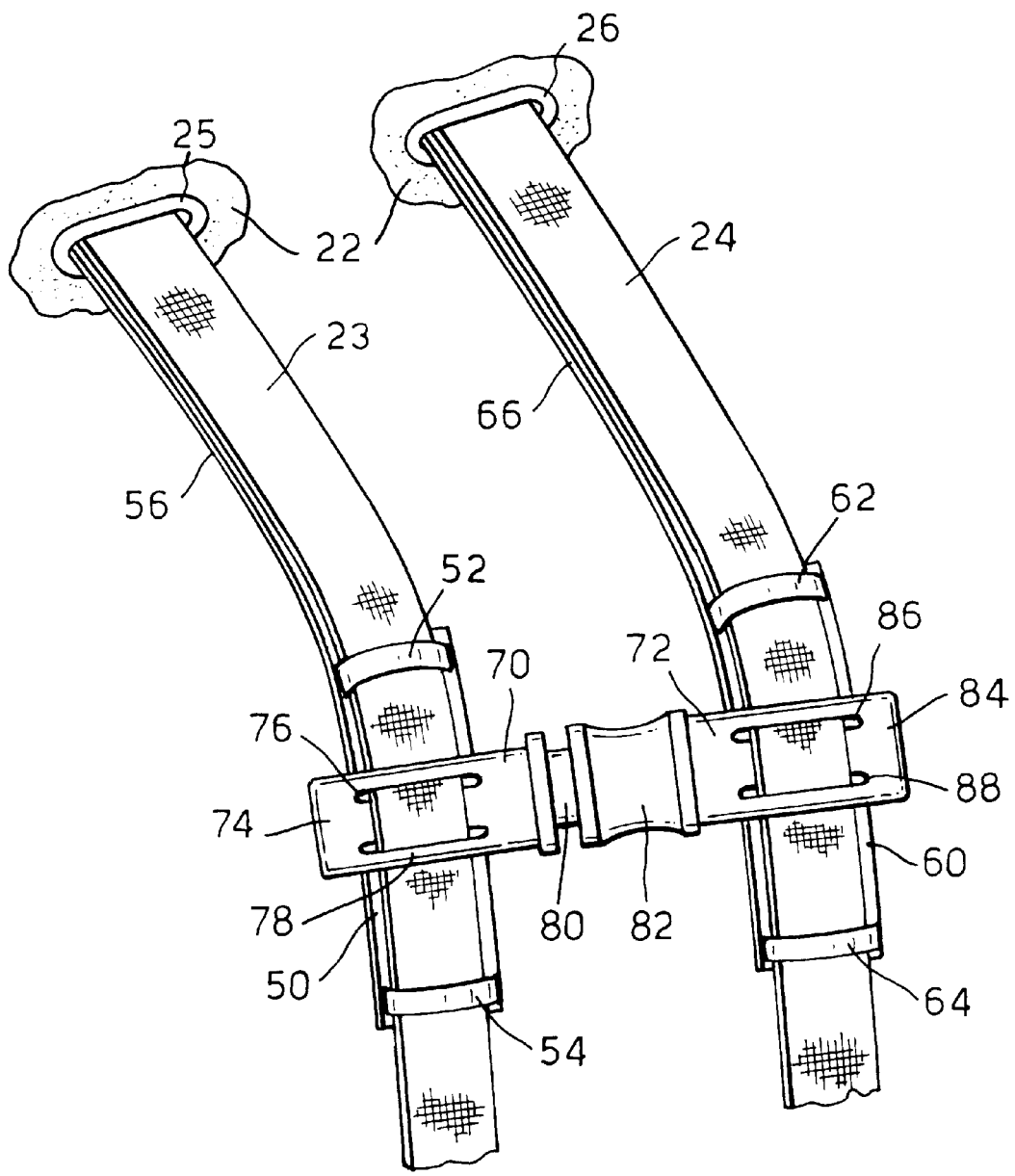

CHILD SAFETY SEAT

This application claims the benefit of Provisional application Ser. No. 60/209,662, filed Jun. 6, 2000.

FIELD

This invention relates to a child safety seat for use in a vehicle, of the type comprising a seat body having a seat back, a harness for a child occupant of the seat secured to the seat body and including a pair of shoulder straps extending through respective slots in the seat back to means for adjusting the effective length of the shoulder straps, a respective lap strap connected to each shoulder strap, a respective shoulder pad slidably mounted on each shoulder strap, a buckle interconnecting the lap straps at their junctions with the shoulder straps and a separable link assembly having a first link part slidably mounted on one shoulder strap and a second link part slidably mounted on the other shoulder strap, the first and second link parts having interlocking formations adapted to engage with one another.

RELATED ART

U.S. Pat. No. 5,839,793 discloses a seat of this type in which the link assembly interconnects the bottom ends of the shoulder pads. The link assembly serves to control the distance between the shoulder straps, reducing any tendency for the shoulder straps to slip off the shoulders of a child occupant of the seat.

Since the shoulder pads and the link assembly are slidable together along the shoulder straps, they can be positioned in the desired location with the link assembly level with the child's chest.

It is already known to provide the shoulder pads with a relatively high friction surface positioned to rest against the shoulders of the child. The shoulder pads are held by tether straps at a fixed distance from the seat back regardless of adjustment of the effective length of the shoulder straps. In the event of sudden deceleration, for example during an accident, the increased friction provided by the shoulder pads reduces the tendency for the child's shoulders to slide forwards in the harness and thus reduces forward movement of the child's body. The shoulder pads may be held on to the respective shoulder straps by a pair of loops, each secured near a respective end of the shoulder pad and having the shoulder strap threaded therethrough.

SUMMARY OF THE INVENTION

According to the invention, in a child safety seat of the type described above, each shoulder pad has upper and lower loops attached to upper and lower ends thereof, the corresponding shoulder strap being threaded through said upper and lower loops, and a respective fixed-length tether extends between the upper end of each shoulder pad and the seat back, respective link parts being slidably mounted on each shoulder strap between the upper and lower loops.

With this arrangement, the loops limit the range of movement of the link parts relative to the pads. Since the extend of movement of the pads towards the buckle is limited by the corresponding tether, the link parts are prevented from moving undesirably close to the buckle, in which position, they would be of limited effectiveness in restricting slippage of the shoulder straps to slip off the shoulders of a child occupant of the seat and the link might be at or near soft parts of the child's body. The upper loops restrict movement of the link towards the child's neck.

BRIEF DESCRIPTION OF THE DRAWINGS

FIG. 2 is a perspective view of part of the harness of the seat shown in FIG. 1.

DETAILED DESCRIPTION OF THE PREFERRED EMBODIMENT

Figure 1:
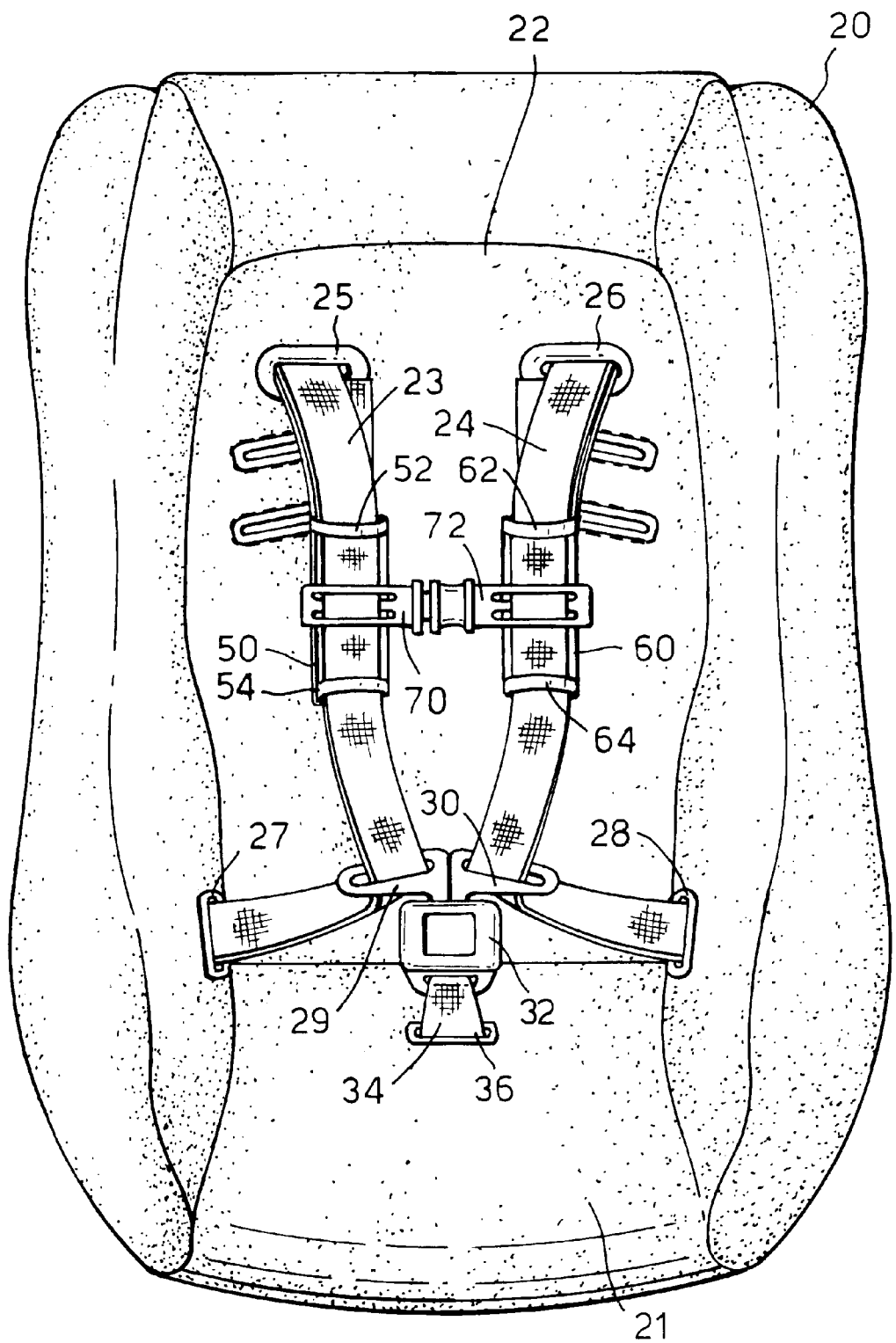
FIG. 1 is a front view of a child safety seat in accordance with the invention.

Referring to FIG. 1, a child safety seat comprises a seat body 20 including a seat portion 21 and a back portion 22 upon and against which a child can rest. A pair of straps 23 and 24 extend through slots 25 and 26 in the back portion 22 and have first opposite ends secured behind or beneath the seat. Similarly the second opposite end of each strap 23, 24 extends through a respective slot 27, 28 in the seat portion 21 below which it is fixedly secured. Respective buckle tongues 29 and 30 are slidably mounted on the straps 23 and 24. Thus that the portions of the straps 23 and 24 between the tongues 29 and 30 and the upper slots 25 and 26 serve as shoulder strap portions, while the portions between the buckle tongues 29 and 30 and the lower slots 27 and 28 serve as lap strap portions.

The tongues 29 and 30 engage in a buckle 32 which is secured to a first end of a crotch strap 34, the other end of which projects through a slot 36 in the seat portion 21 where it is fixedly secured.

As can be more clearly seen in FIG. 2, a shoulder pad 50 is slidably mounted on the shoulder portion of the strap 23 by upper and lower fabric loops 52 and 54 through which the strap 23 extends. A tether 56 extends from the upper end of the shoulder pad 50 through the slot 25 to an anchorage behind the seat back 22 so as to limit the extent of movement of the shoulder pad 50 towards the buckle tongue 29. A similar shoulder pad 60, having loops 62 and 64 and a tether 66, is mounted on the shoulder portion of the other strap 24.

The shoulder strap portions 23 and 24 are linked by a quick-disconnect connector of the type described in U.S. Pat. No. 5,084,946, consisting of a male member 70 and a female member 72. The male member 70 comprises a body part 74 having two parallel slots 76 and 78 through which the straps 23 is threaded, together with a tongue 80 which engages in a buckle part 82 of the female member 72. As well as its buckle part 82, the female member 72 also includes a body part 84 having a pair of slots 86 and 88 through which the strap 24 is threaded. The male and female members 70 and 72 are fitted on to their respective straps 23 and 24 between the upper loops 52, 62 and the lower loops 54, 64 of the corresponding shoulder pads 50, 60. Consequently, sliding movement of the connector members 70 and 72 along the straps 23 and 24 is limited thereby. Since downward sliding movement of the shoulder pads 50 and 52 is limited by the tethers 56 and 66, the extent to which the connector can move downwardly towards the tongues 29 and 30 is correspondingly limited.

What is claimed is:

1. A child safety seat comprising:
   a seat body having a seat back,
   a harness for a child occupant of the seat secured to the seat body and including a pair of shoulder straps extending through respective slots in the seat back and a respective lap strap connected to each shoulder strap,
   a respective shoulder pad slidably mounted on each shoulder strap, each shoulder pad having an upper loop attached to its upper end and a lower loop attached to its lower end, the corresponding shoulder strap being threaded through said upper and lower loops, a buckle interconnecting the lap straps at their junctions with the shoulder straps, a separable link assembly having a first link part slidably mounted on one shoulder strap between its upper and lower loops and a second link part slidably mounted on the other shoulder strap between its upper and lower loops, the first and second link parts having interlocking formations adapted to engage with one another, and a respective fixed-length tether connected to the upper end of each shoulder pad and extending through its respective slot to an anchorage behind the seat back.

2. A child safety seat according to claim 1, wherein a first strap of the pair of shoulder straps is integrally formed with a corresponding first lap strap to form a continuous strap which extends slidably through a slot in a first tongue that is engageable with the buckle and a second strap of the pair of shoulder straps is integrally formed with a corresponding second lap strap to form a continuous strap which extends slidably through a slot in a second tongue which is also engageable with the buckle.

* * * * *